United States Patent
Kato et al.

(10) Patent No.: US 10,974,672 B2
(45) Date of Patent: Apr. 13, 2021

(54) VEHICLE AND METHOD OF CONTROLLING VEHICLE

(71) Applicant: TOYOTA JIDOSHA KABUSHIKI KAISHA, Toyota (JP)

(72) Inventors: Sho Kato, Nissin (JP); Osamu Yumita, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 260 days.

(21) Appl. No.: 16/036,055

(22) Filed: Jul. 16, 2018

(65) Prior Publication Data

US 2020/0017043 A1   Jan. 16, 2020
US 2021/0078515 A9   Mar. 18, 2021

(30) Foreign Application Priority Data

Oct. 18, 2017   (JP) .............................. JP2017-201649

(51) Int. Cl.
*B60R 16/033* (2006.01)
*B60L 1/00* (2006.01)
*B60L 7/10* (2006.01)
*H02J 7/14* (2006.01)
*B60L 1/08* (2006.01)
*B60W 30/18* (2012.01)

(52) U.S. Cl.
CPC .......... *B60R 16/033* (2013.01); *B60L 1/003* (2013.01); *B60L 7/10* (2013.01); *B60L 1/08* (2013.01); *B60W 30/18127* (2013.01); *H02J 7/1446* (2013.01)

(58) Field of Classification Search
CPC .......... B60R 16/033; B60L 1/003; B60L 7/10; B60L 1/08; B60L 50/70; H02J 7/1446; H02J 2300/30; B60W 30/18127
USPC ........................................... 701/36
See application file for complete search history.

(56) References Cited

U.S. PATENT DOCUMENTS 5,898,282 A *   4/1999   Drozdz ............... B60L 15/2045
                                                    318/139
8,978,370 B2 *   3/2015   Gonze ..................... F01N 3/323
                                                    60/311

(Continued)

FOREIGN PATENT DOCUMENTS

JP     2006-197756 A    7/2006
JP     2007-123169 A    5/2007

(Continued)

*Primary Examiner* — Jonathan M Dager
*Assistant Examiner* — Jean W Charleston
(74) *Attorney, Agent, or Firm* — Finnegan, Henderson, Farabow, Garrett & Dunner, LLP

(57) ABSTRACT

A vehicle is equipped with an electric storage device, a drive motor, an auxiliary that can be driven by a regenerative electric power, and a control unit. The control unit performs a non-chargeable control for causing the auxiliary to consume the regenerative electric power when the electric storage device is in a non-chargeable state, and performs a specific maneuver control for causing the auxiliary to consume the regenerative electric power even when the electric storage device is in a chargeable state in the case where an operational maneuver for making a change to an operation mode in which a larger amount of the regenerative electric power is generated is performed with the regenerative electric power generated.

6 Claims, 4 Drawing Sheets

(56) References Cited

U.S. PATENT DOCUMENTS

| | | | | |
|---|---|---|---|---|
| 2010/0217466 | A1* | 8/2010 | Ichikawa | B60L 58/20 |
| | | | | 701/22 |
| 2012/0022738 | A1* | 1/2012 | Kato | B60L 58/15 |
| | | | | 701/22 |
| 2013/0116889 | A1* | 5/2013 | Zhang | B60L 53/20 |
| | | | | 701/36 |
| 2013/0173105 | A1* | 7/2013 | Kojima | B60L 58/21 |
| | | | | 701/22 |
| 2014/0200756 | A1* | 7/2014 | Sisk | B60L 50/66 |
| | | | | 701/22 |
| 2015/0258986 | A1* | 9/2015 | Hayakawa | B60W 10/06 |
| | | | | 701/22 |
| 2016/0137185 | A1* | 5/2016 | Morisaki | B60K 6/445 |
| | | | | 701/22 |

FOREIGN PATENT DOCUMENTS

| | | | |
|---|---|---|---|
| JP | 2008-186620 | | 8/2008 |
| JP | 2012-001168 A | | 1/2012 |
| JP | 2012-106652 | * | 5/2012 |
| JP | 2012-106652 | | 6/2012 |
| JP | 2013-218789 | * | 10/2013 |

* cited by examiner

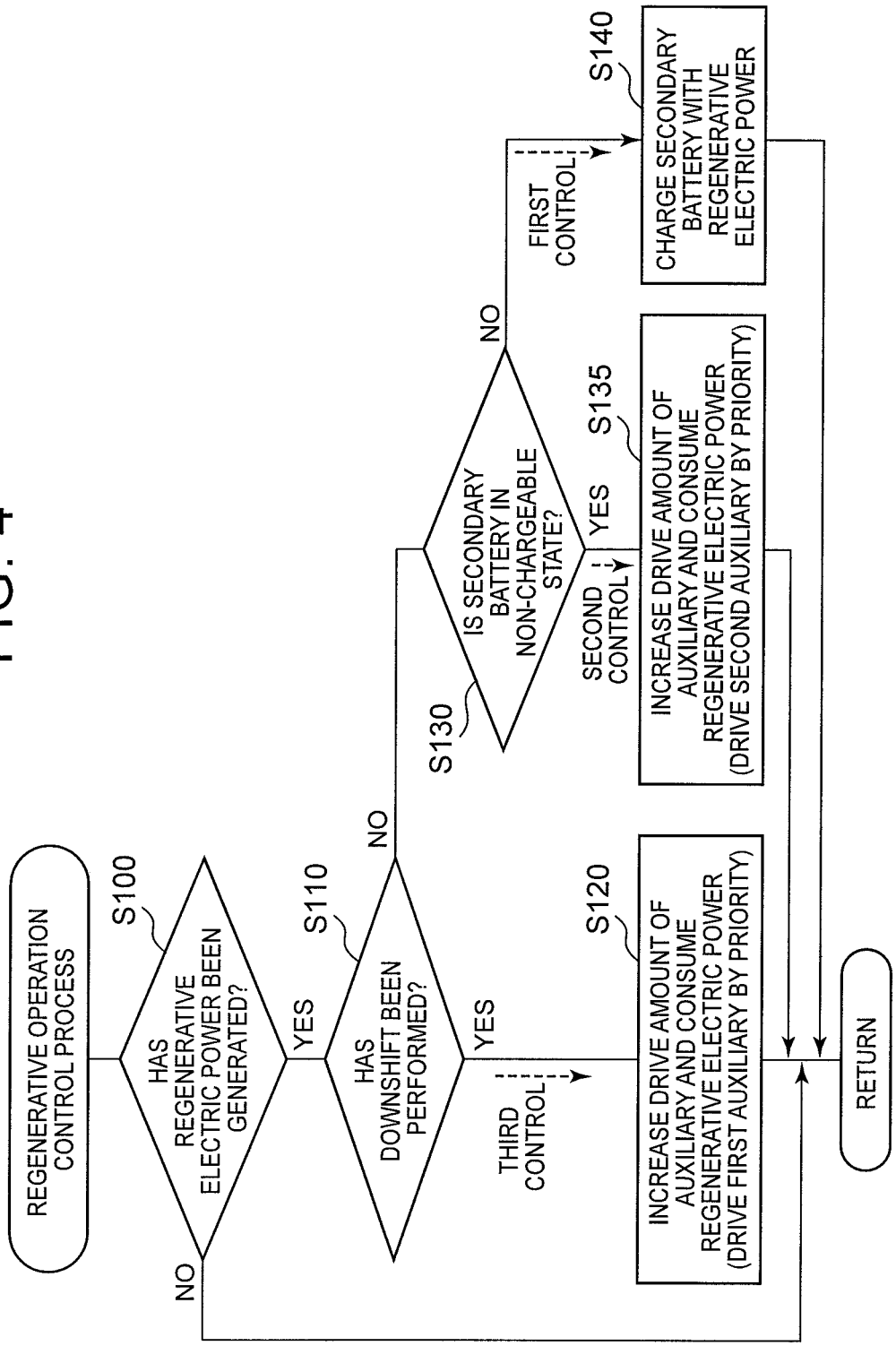

VEHICLE AND METHOD OF CONTROLLING VEHICLE

INCORPORATION BY REFERENCE

The disclosure of Japanese Patent Application No. 2017-201649 filed on Oct. 18, 2017 including the specification, drawings and abstract is incorporated herein by reference in its entirety.

BACKGROUND

1. Technical Field

The disclosure relates to a vehicle and a method of controlling the vehicle.

2. Description of Related Art

In a fuel cell vehicle which is mounted with a fuel cell, a regenerative electric power is generated in a drive motor of the vehicle at the time of deceleration or the like of the vehicle. This regenerative electric power is generally used to charge a secondary battery or the like with which the fuel cell is mounted, so the energy efficiency in the fuel cell vehicle is enhanced. In some cases, however, the secondary battery cannot be charged, for example, when the remaining capacity (SOC) of the secondary battery is equal to or larger than a reference value. In this case, conventionally, an air compressor or the like with which the fuel cell vehicle is mounted is caused to consume the regenerative electric power with which the secondary battery cannot be charged (e.g., see Japanese Unexamined Patent Application Publication No. 2013-218789 (JP 2013-218789 A)).

SUMMARY

However, when the above-mentioned control is performed, an auxiliary, for example, the air compressor or the like may start consuming the regenerative electric power all of a sudden, independently of the intention of a user of the fuel cell vehicle. As a result, the user of the fuel cell vehicle may develop a feeling of strangeness due to driving noise of the air compressor or the like. Besides, a user of any vehicle that is configured to cause an auxiliary to consume a regenerative electric power with which a secondary battery cannot be charged as well as the fuel cell vehicle may develop a feeling of strangeness due to driving noise of the auxiliary generated at the time of the start of consumption of the regenerative electric power. Therefore, there have been demands for an art of restraining the user from developing a feeling of strangeness in consuming the surplus regenerative electric power with which the secondary battery cannot be charged through the use of the auxiliary, for example, the air compressor or the like.

The disclosure can be realized as the following aspects.

An aspect of the disclosure relates to a vehicle including: an electric storage device which is configured to be charged; a drive motor which is configured to be driven by an electric power and is configured to generate a regenerative electric power; an auxiliary that can be driven by the regenerative electric power generated through a regenerative electric power generation of the drive motor; and a control unit, wherein the control unit is configured to: i) perform a non-chargeable control for supplying the regenerative electric power to the auxiliary and causing the auxiliary to consume the regenerative electric power, when the electric storage device is in a non-chargeable state where the electric storage device cannot be charged; and ii) perform a specific maneuver control for supplying the regenerative electric power to the auxiliary and causing the auxiliary to consume the regenerative electric power in accordance with an operational maneuver for making a change to an operation mode in which a larger amount of the regenerative electric power is generated in the vehicle, even when the electric storage device is in a chargeable state where the electric storage device can be charged, in a case where the operational maneuver is performed with the regenerative electric power generated.

According to the vehicle in this aspect of the disclosure, when the operational maneuver for making a change to the operation mode in which a larger amount of the regenerative electric power is generated is performed with the regenerative electric power generated, the auxiliary is caused to consume the regenerative electric power in accordance with the operational maneuver. Therefore, the increase in driving noise of the auxiliary for consuming the regenerative electric power is concomitant with the aforementioned operational maneuver performed by the user of the vehicle. As a result, the feeling of strangeness imparted to the user by the increase in driving noise of the auxiliary resulting from the consumption of the regenerative electric power can be reduced.

In the above aspect, the control unit may be configured to perform the specific maneuver control when the operational maneuver is performed and the electric storage device is estimated to assume the non-chargeable state due to the regenerative electric power generated in accordance with running of the vehicle.

According to the vehicle in this aspect of the disclosure, the operation of causing the auxiliary to consume the regenerative electric power can be performed at a more appropriate timing.

In the above aspect, the vehicle may further include a navigation device that provides guidance on a running route to a destination, wherein the control unit may be configured to estimate, based on information acquired from the navigation device, whether or not the electric storage device assumes the non-chargeable state.

According to the vehicle in this aspect of the disclosure, the accuracy in estimating whether or not the electric storage device is in the non-chargeable state can be further enhanced.

In the above aspect of the disclosure, the auxiliary may include a first auxiliary and a second auxiliary. A driving noise of the second auxiliary is quieter than a driving noise of the first auxiliary. The control unit may be configured to cause the first auxiliary to consume the regenerative electric power, and use the second auxiliary as well as the first auxiliary to consume the regenerative electric power when the first auxiliary alone cannot consume the regenerative electric power, when performing the specific maneuver control.

According to the vehicle in this aspect of the disclosure, even when the first auxiliary generates a relatively loud driving noise in performing the specific maneuver control, the generation of this driving noise is concomitant with the operational maneuver for making a change to the operation mode in which a larger amount of the regenerative electric power is generated. Therefore, the user can be restrained from developing a feeling of strangeness. Besides, in the case where the second auxiliary as well as the first auxiliary is used to consume the regenerative electric power, even when the generation of driving noise of the second auxiliary is not concomitant with the aforementioned operational maneuver, the user can be restrained from developing a feeling of strangeness, because the driving noise of the second auxiliary is relatively quiet.

In the above aspect of the disclosure, the auxiliary may include a first auxiliary and a second auxiliary. A driving noise of the second auxiliary is quieter than a driving noise of the first auxiliary. The control unit may be configured to cause the second auxiliary to consume the regenerative electric power, and use the first auxiliary as well as the second auxiliary to consume the regenerative electric power when the second auxiliary alone cannot consume the regenerative electric power, in performing the non-chargeable control.

According to the vehicle in this aspect of the disclosure, when the second auxiliary alone cannot consume the regenerative electric power in performing the non-chargeable control, the first auxiliary as well as the second auxiliary is used to consume the regenerative electric power. Therefore, the driving noise of the auxiliaries resulting from the consumption of the regenerative electric power by the auxiliaries can be abated, and the user can be restrained from developing a feeling of strangeness.

Another aspect of the disclosure relates to a method of controlling a vehicle. The vehicle includes an electric storage device being configured to be charged, a drive motor which is configured to be driven by an electric power and is configured to generate a regenerative electric power, and an auxiliary which is configured to be driven by the regenerative electric power generated through regenerative electric power generation of the drive motor. The method includes: supplying the regenerative electric power to the auxiliary and causing the auxiliary to consume the regenerative electric power, when the electric storage device is in a non-chargeable state where the electric storage device cannot be charged; and supplying the regenerative electric power to the auxiliary and causing the auxiliary to consume the regenerative electric power in accordance with an operational maneuver for making a change to an operation mode in which a larger amount of the regenerative electric power is generated in the vehicle, even when the electric storage device is in a chargeable state where the electric storage device can be charged, in a case where the operational maneuver is performed with the regenerative electric power generated.

The disclosure can be realized in various embodiments. For example, in embodiments such as a method of consuming regenerative electric power, a computer program that realizes the method of controlling the vehicle, a non-transitory storage medium in which the computer program is stored, and the like, in addition to the foregoing vehicle and the foregoing method of controlling a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart representing still another regenerative operation control process routine.

DETAILED DESCRIPTION OF EMBODIMENTS

Figure 1:
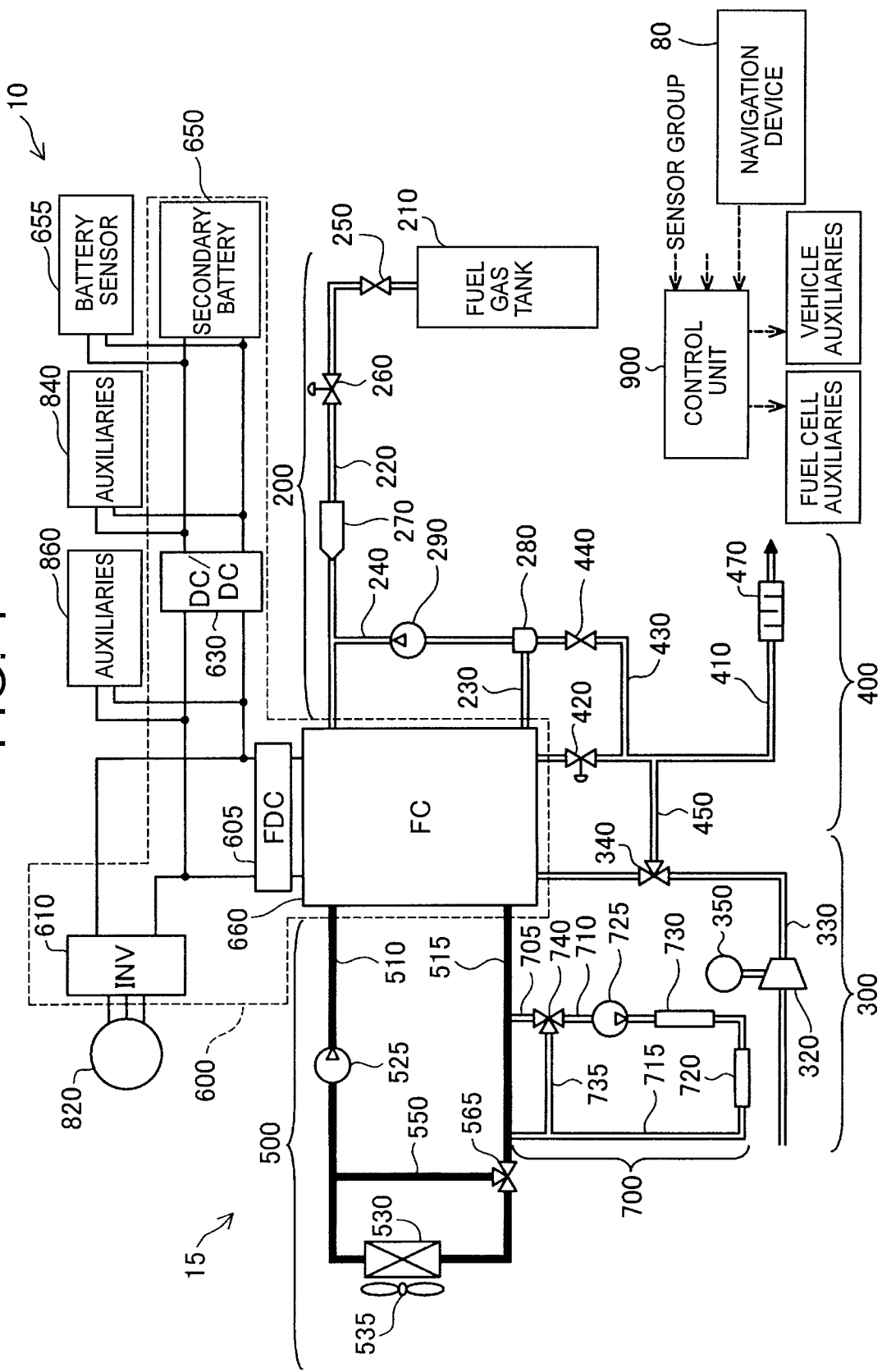
FIG. 1 is a block diagram representing the overall configuration of a fuel cell vehicle.

A. First Embodiment (A-1) General Configuration of Fuel Cell Vehicle:

FIG. 1 is an illustrative view schematically showing the overall configuration of a fuel cell vehicle 10 as the first embodiment. The fuel cell vehicle 10 is equipped with a fuel cell system 15, an electric power circuit 600, a heating system 700, a drive motor 820, and a control unit 900. The fuel cell system 15 is equipped with a fuel cell 660, a fuel gas supply system 200, an oxidation gas supply system 300, an exhaust gas system 400, and a cooling system 500.

The fuel cell 660 has a stack configuration in which a plurality of single cells are laminated on one another, and generates electric power by being supplied with fuel gas containing hydrogen and oxidation gas containing oxygen. The fuel cell 660 according to the present embodiment is a polymer electrolyte fuel cell. In each of the single cells constituting the fuel cell 660, a flow channel (an anode-side flow channel) through which fuel gas flows is formed on an anode side, and a flow channel (a cathode-side flow channel) through which oxidation gas flows is formed on a cathode side, with an electrolyte membrane interposed therebetween. Besides, a refrigerant flow channel through which a refrigerant for cooling the fuel cell 660 flows is formed inside the fuel cell 660. Incidentally, the fuel cell 660 may not necessarily be a polymer electrolyte fuel cell. Other fuel cells such as a solid oxide fuel cell and the like may be adopted.

The fuel gas supply system 200 is equipped with a fuel gas tank 210, a fuel gas supply pipe 220, a fuel gas exhaust pipe 230, a fuel gas recirculation pipe 240, a main valve 250, a regulator 260, an injector 270, a gas-liquid separator 280, and a hydrogen pump 290. The fuel gas tank 210 is a storage device in which hydrogen gas as fuel gas is stored, and is connected to the fuel cell 660 via the fuel gas supply pipe 220. In the fuel gas supply system 200, the hydrogen gas stored in the fuel gas tank 210 is supplied to the anode-side flow channel of the fuel cell 660 through the opening/closing of the flow channel of the fuel gas supply pipe 220 by the main valve 250 and after being decompressed in the regulator 260 and discharged from the injector 270.

The fuel gas exhaust pipe 230 is a flow channel through which the anode off-gas discharged from the fuel cell 660 flows. The fuel gas recirculation pipe 240 is connected to the fuel gas exhaust pipe 230 and a region of the fuel gas supply pipe 220 located downstream of the injector 270. The anode off-gas discharged to the fuel gas exhaust pipe 230 from the fuel cell 660 is introduced again into the fuel gas supply pipe 220 via the fuel gas recirculation pipe 240. Therefore, in the fuel cell system 15, fuel gas circulates through the fuel gas exhaust pipe 230, the fuel gas recirculation pipe 240, part of the fuel gas supply pipe 220, and the flow channel of fuel gas formed in the fuel cell 660, while hydrogen is consumed through electric power generation. The fuel gas recirculation pipe 240 is provided with the foregoing hydrogen pump 290 to generate a driving force for circulating fuel gas in the flow channel and adjust the flow rate of fuel gas.

The gas-liquid separator 280 is provided at a portion where the fuel gas exhaust pipe 230 and the fuel gas recirculation pipe 240 are connected to each other. Anode off-gas contains impurities such as nitrogen, vapors and the like as well as the hydrogen that has not been consumed through electric power generation. The gas-liquid separator 280 separates the water in anode off-gas from gases (hydrogen, nitrogen and the like). In the present embodiment, the impurities are removed from the fuel gas circulating in the aforementioned flow channel, via the gas-liquid separator 280. The removal of the impurities will be described later.

The oxidation gas supply system 300 is equipped with an air compressor 320, an oxidation gas supply pipe 330, and a flow dividing valve 340. The fuel cell 660 according to the present embodiment uses air as oxidation gas. The air compressor 320 compresses air by being driven by an air compressor motor 350, and supplies air to the cathode-side flow channel of the fuel cell 660 via the oxidation gas supply pipe 330. The flow dividing valve 340 is provided at a connection portion of the oxidation gas supply pipe 330 where an oxidation gas bypass pipe 450 that will be described later is connected to the oxidation gas supply pipe 330.

The exhaust gas system 400 is equipped with an exhaust gas pipe 410, a pressure regulating valve 420, a fuel gas discharge pipe 430, a purge valve 440, an oxidation gas bypass pipe 450, and a silencer 470. The exhaust gas pipe 410 is a flow channel through which cathode off-gas is discharged from the fuel cell 660. The pressure regulating valve 420 is provided in the exhaust gas pipe 410. The pressure regulating valve 420 regulates the pressure of oxidation gas in the fuel cell 660. The fuel gas discharge pipe 430 connects the gas-liquid separator 280 and the exhaust gas pipe 410 to each other. The purge valve 440 is provided on the fuel gas discharge pipe 430. The control unit 900 opens the purge valve 440 and discharges water and gases from the gas-liquid separator 280 when the concentration of nitrogen in anode off-gas becomes high or when the amount of water in the gas-liquid separator 280 becomes large. Thus, the concentration of impurities in the fuel gas circulating in the flow channel is reduced as described already. In the present embodiment, the fuel gas discharge pipe 430 is connected to the exhaust gas pipe 410 in a region downstream of the pressure regulating valve 420, and the hydrogen gas in the anode off-gas discharged via the purge valve 440 is diluted by cathode off-gas before being discharged to the atmosphere.

The oxidation gas bypass pipe 450 connects the oxidation gas supply pipe 330 and the exhaust gas pipe 410 to each other. The flow dividing valve 340, which has been already mentioned, is provided at the connection portion where the oxidation gas bypass pipe 450 and the oxidation gas supply pipe 330 are connected to each other. When opening the purge valve 440, the control unit 900 increases the drive amount of the air compressor 320, and controls the flow dividing valve 340 to cause air to flow through the oxidation gas bypass pipe 450. Thus, the hydrogen gas discharged to the exhaust gas pipe 410 via the purge valve 440 can be sufficiently diluted, regardless of the amount of electric power generated by the fuel cell 660. Incidentally, in the present embodiment, the drive amount of the air compressor 320 may be increased to consume regenerative electric power, as will be described later. In this case, the flow rate of the oxidation gas supplied to the fuel cell 660 may be restrained from increasing, by controlling the flow dividing valve 340 and causing air to flow through the oxidation gas bypass pipe 450. The silencer 470 is provided in the exhaust gas pipe 410 downstream of the connection portion where the fuel gas discharge pipe 430 and the oxidation gas bypass pipe 450 are connected to each other, and abates exhaust noise.

The cooling system 500 is equipped with a refrigerant supply pipe 510, a refrigerant discharge pipe 515, a refrigerant bypass pipe 550, a refrigerant pump 525, a radiator 530, and a changeover valve 565. The refrigerant supply pipe 510 is a pipe for supplying the refrigerant to the fuel cell 660, and the refrigerant pump 525 is arranged in the refrigerant supply pipe 510. The refrigerant discharge pipe 515 is a pipe for discharging the refrigerant from the fuel cell 660. The radiator 530 for cooling the refrigerant is provided between a downstream portion of the refrigerant discharge pipe 515 and an upstream portion of the refrigerant supply pipe 510. The radiator 530 is provided with a radiator fan 535. The radiator fan 535 delivers wind to the radiator 530 and promotes the dissipation of heat from the radiator 530. The aforementioned refrigerant pump 525 adjusts the flow rate of the refrigerant circulating through the refrigerant supply pipe 510, the refrigerant discharge pipe 515, and the refrigerant flow channel in the fuel cell 660.

The refrigerant bypass pipe 550 is a flow channel that connects the refrigerant supply pipe 510 and the refrigerant discharge pipe 515 to each other. The changeover valve 565 is provided at a connection portion where the refrigerant discharge pipe 515 and the refrigerant bypass pipe 550 are connected to each other. The changeover valve 565 is a valve capable of changing the ratio between the amount of the refrigerant flowing via the radiator 530 and the amount of the refrigerant flowing while bypassing the radiator 530, and is configured as a three-way valve in the present embodiment. In the present embodiment, as will be described later, the drive amount of the refrigerant pump 525 may be increased to consume regenerative electric power. In this case, the fuel cell 660 can be restrained from being excessively cooled, by causing the refrigerant to flow through the refrigerant bypass pipe 550 by controlling the changeover valve 565.

The electric power circuit 600 is equipped with the fuel cell 660 that also belongs to the fuel cell system 15, an FC step-up converter 605 (an FDC 605), an inverter 610, a battery converter 630, and a secondary battery 650. A drive motor 820, low-voltage auxiliaries 840, and high-voltage auxiliaries 860 are connected to the electric power circuit 600.

The FC step-up converter 605 is a DC/DC converter that steps up the output voltage of the fuel cell 660 to a high voltage that can be utilized in the drive motor 820. The inverter 610 converts the DC voltage stepped up by the FC step-up converter 605 into an AC voltage and supplies the AC voltage to the drive motor 820. The drive motor 820 is a motor that drives wheels of a vehicle, and carries out regeneration to generate a regenerative electric power at the time of deceleration of the vehicle.

The battery converter 630 is a bidirectional DC/DC converter that steps down the voltage stepped up by the FC step-up converter 605 or a voltage generated through regenerative operation of the drive motor 820 and supplies the stepped-down voltage to the secondary battery 650, or that steps up the voltage of the secondary battery 650 and supplies the stepped-up voltage to the inverter 610. The secondary battery 650 is charged with the electric power generated by the fuel cell 660 and the regenerative electric power from the drive motor 820. The secondary battery 650 functions as an electric power supply which is configured to drive the drive motor 820 and the low-voltage auxiliaries 840. The secondary battery 650 can be configured as, for example, a lithium-ion battery or a nickel hydride battery. The secondary battery 650 may be a rechargeable electric storage device. Instead of being configured as the secondary battery, this electric storage device may be, for example, a capacitor. Incidentally, the secondary battery 650 is provided with a battery sensor 655 for detecting operation states such as a voltage, current, remaining capacity (SOC) and the like of the secondary battery 650.

The low-voltage auxiliaries 840 and the high-voltage auxiliaries 860 constitute a group of auxiliaries arranged in respective portions in the fuel cell vehicle 10, and include fuel cell auxiliaries included in the fuel cell system 15, and vehicle auxiliaries regarding the control of the state of the fuel cell vehicle 10. The low-voltage auxiliaries 840, which are driven at a relatively low voltage, can include, for example, lighting apparatuses such as headlights, stop lamps and the like, direction indicators, wipers, measuring instruments and the like in an instrument panel, and a navigation device 80 that will be described later, as the vehicle auxiliaries. Besides, the low-voltage auxiliaries 840 can include drive units for opening/closing various valves provided in pipelines of fuel gas, oxidation gas, and the refrigerant, as the fuel cell auxiliaries. The high-voltage auxiliaries 860, which are driven at a relatively high voltage, can include, for example, the refrigerant pump 525, the air compressor 320, the hydrogen pump 290, and the radiator fan 535, as the fuel cell auxiliaries. Besides, the high-voltage auxiliaries 860 can include an electric heater 730 of the heating system 700 that will be described later, as the vehicle auxiliary. Incidentally, the low-voltage auxiliaries 840 are supplied with an electric power obtained by further stepping down an electric power supplied from a wire that connects the battery converter 630 and the secondary battery 650 to each other, through the use of a DC/DC converter (not shown). Besides, the high-voltage auxiliaries 860 may be connected to the wire that connects the battery converter 630 and the secondary battery 650 to each other, in addition to being connected to a wire that connects the inverter 610 and the battery converter 630 to each other as shown in FIG. 1.

The heating system 700 is used to heat the fuel cell vehicle 10, and is equipped with a branch pipe 705, a three-way valve 740, a hot water supply pipe 710, a hot water pump 725, the electric heater 730, a heater core 720, a hot water discharge pipe 715, and a hot water recirculation pipe 735. The branch pipe 705 and the hot water discharge pipe 715 are connected to the foregoing refrigerant discharge pipe 515 with which the cooling system 500 is equipped. The branch pipe 705, the hot water supply pipe 710, and the hot water discharge pipe 715 are connected sequentially. The branch pipe 705 is supplied with part of the warmed refrigerant discharged from the fuel cell 660. The three-way valve 740 is provided at a connection portion where the branch pipe 705 and the hot water supply pipe 710 are connected to each other. The three-way valve 740 adjusts the distribution of the refrigerant from the cooling system 500 to the heating system 700. The hot water supply pipe 710 is provided with a hot water pump 725 that generates a driving force for causing the refrigerant to flow in the pipeline of the heating system 700, and the electric heater 730 for heating the refrigerant flowing through the hot water supply pipe 710. The heater core 720 for heating air through the use of the heat of the refrigerant flowing through the heating system 700 is provided at a connection portion where the hot water supply pipe 710 and the hot water discharge pipe 715 are connected to each other. The air warmed by the heater core 720 is delivered into the fuel cell vehicle 10 and used to heat the interior of the vehicle. The hot water discharge pipe 715 returns the refrigerant discharged from the heater core 720 to the refrigerant discharge pipe 515 of the cooling system 500. The hot water recirculation pipe 735 connects the hot water discharge pipe 715 and the three-way valve 740 to each other and returns the refrigerant discharged from the heater core 720 to the hot water supply pipe 710.

The control unit 900 is configured as a microcomputer, and has a CPU, a ROM, a RAM, and input/output ports. The control unit 900 performs electric power generation control of the fuel cell system 15 and performs the control of the entire fuel cell vehicle 10 including the electric power circuit 600. The control unit 900 acquires output signals from sensors provided at the respective portions of the fuel cell vehicle 10 (including sensors provided at respective portions of the fuel cell system 15, an accelerator operation amount sensor, a brake pedal sensor, a shift position sensor, and a vehicle speed sensor), and further acquires information regarding a set running route and the like from the later-described navigation device 80 mounted in the fuel cell vehicle 10. Then, the control unit 900 outputs drive signals to the respective portions regarding electric power generation, running and the like in the fuel cell vehicle 10. In concrete terms, the control unit 900 outputs drive signals to the fuel cell auxiliaries, vehicle auxiliaries and the like that have been already mentioned. At this time, the control unit 900 can control the supply of electric power to the secondary battery 650 and the respective auxiliaries from the fuel cell 660 and the drive motor 820. Incidentally, the control unit 900 that performs the above-mentioned functions may not necessarily be configured as a single control unit. For example, the control unit 900 may be configured as a plurality of control units such as a control unit regarding the operation of the fuel cell system 15, a control unit regarding the running of the fuel cell vehicle 10, a control unit that performs the control of the vehicle auxiliaries that are irrelevant to running, and the like, and necessary pieces of information may be exchanged among the plurality of these control units.

The control unit 900 performs first control, second control, and third control. In the first control, the secondary battery 650 is charged with regenerative electric power when the secondary battery 650 is in a chargeable state that will be described later. In the second control, regenerative electric power is supplied to at least one of the auxiliaries and thereby consumed when the secondary battery 650 is in a non-chargeable state that will be described later. In the third control, in the case where an operational maneuver for making a change to an operation mode in which a larger amount of regenerative electric power is generated in the fuel cell vehicle 10 is performed with this regenerative electric power generated, even when the secondary battery 650 is in the chargeable state, the regenerative electric power is supplied to at least one of the auxiliaries and thereby consumed in accordance with the aforementioned operational maneuver. These kinds of control performed by the control unit 900 will be described hereinafter in detail.

Figure 2:
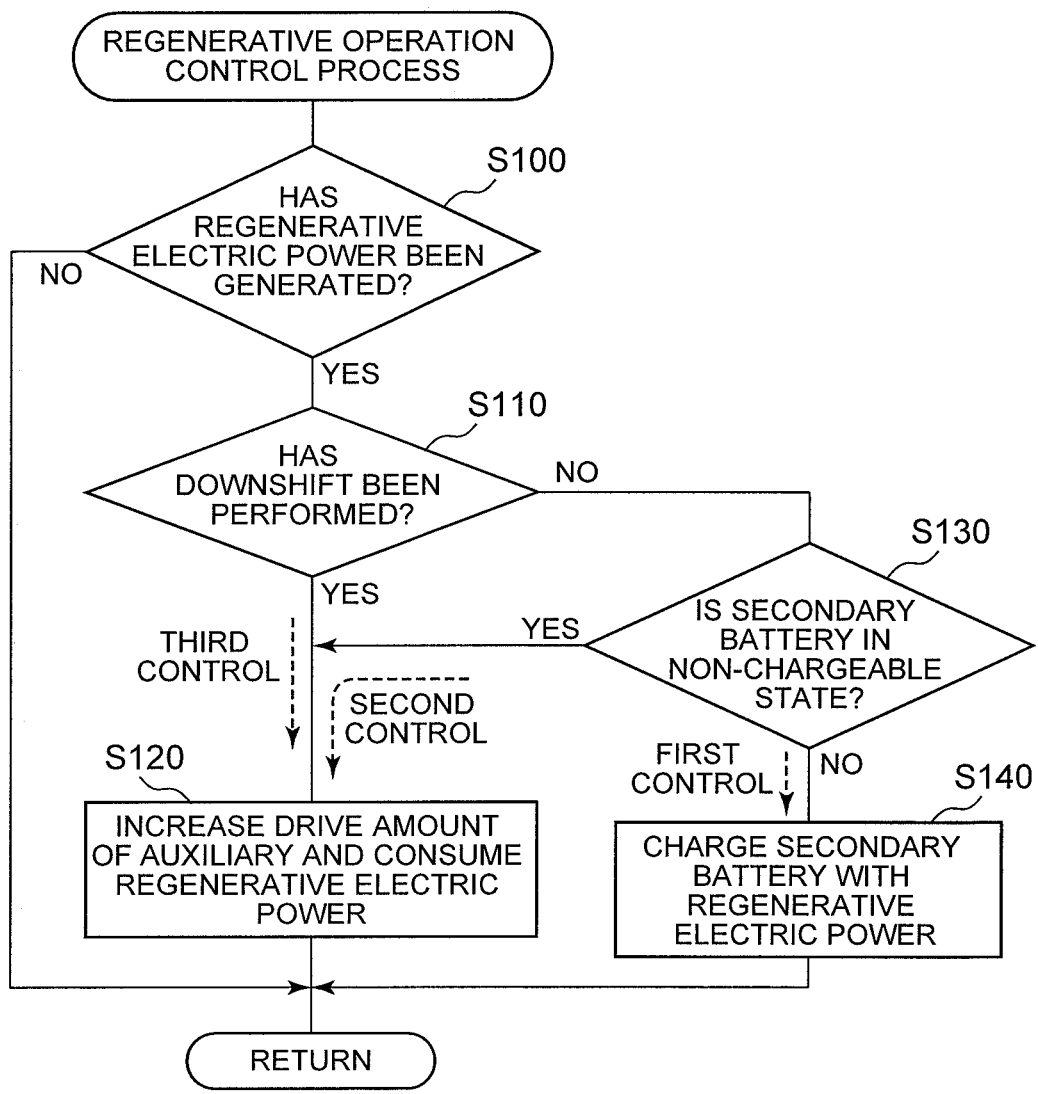
FIG. 2 is a flowchart representing a regenerative operation control process routine.

(A-2) Control at Time of Regenerative Operation:

FIG. 2 is a flowchart representing a regenerative operation control process routine that is executed by the control unit 900 of the fuel cell vehicle 10 according to the present embodiment. The present routine is repeatedly executed by the CPU of the control unit 900 when the fuel cell vehicle 10 is activated.

When the present routine is activated, the CPU of the control unit 900 determines whether or not a regenerative electric power has been generated by the drive motor 820 of the fuel cell vehicle 10 (step S100). In step S100, it can be determined that a regenerative electric power has been generated, for example, when the accelerator operation amount sensor detects that an accelerator is off while the vehicle speed sensor detects that the vehicle speed is equal to or higher than a prescribed reference value. Besides, it may be determined that a regenerative electric power has been generated when the brake pedal sensor detects operation of a brake pedal while the vehicle speed sensor detects that the vehicle speed is equal to or higher than the prescribed reference value. Alternatively, a regenerative electric power may be directly detected in the electric power circuit 600. In this case, it may be determined that a regenerative electric power has been generated when the regenerative electric power is equal to or larger than a prescribed reference value, in addition to determining that a regenerative electric power has been generated when the regenerative electric power assumes a positive value.

If it is determined in step S100 that no regenerative electric power has been generated (NO in step S100), the CPU of the control unit 900 ends the present routine.

If it is determined in step S100 that a regenerative electric power has been generated (YES in step S100), the CPU of the control unit 900 determines, based on a detection signal of the shift position sensor, whether or not a downshift has been performed (step S110). In step S110 of the present embodiment, it is determined that a downshift has been performed when an operation of the downshift is performed and when a state of the downshift continues. In the fuel cell vehicle 10 according to the present embodiment, five shift positions can be utilized. The five shift positions can be, for example, five ranges P, R, N, D and B, which may represent a shift position for parking, a shift position for reverse motion, a shift position for neutral state, a shift position for driving forward, and a shift position for braking. A larger amount of regenerative electric power is generated in an operation mode established when the B range is selected, in comparison with an operation mode established when the D range is selected. In step S110, it is determined that a downshift has been performed, for example, when a change from the D range to the B range is made and when the B range is maintained.

Incidentally, the fuel cell vehicle 10 according to the present embodiment allows the shift position to be changed by a shift lever but may adopt a different configuration. For example, a switch for inputting a command to make a change between operation modes of the fuel cell vehicle 10 may be provided instead of the shift lever. Also, the operation modes that are set by this switch or the like may include an operation mode in which a larger amount of regenerative electric power is generated and an operation mode in which a smaller amount of regenerative electric power is generated. In step S110, it may not necessarily be determined whether or not a downshift has been performed, but it may be determined whether or not an operational maneuver for making a change to the operation mode in which a larger amount of regenerative electric power is generated has been performed in the fuel cell vehicle 10.

If it is determined in step S110 that a downshift has been performed, that is, an operational maneuver for making a change to the operation mode in which a larger amount of regenerative electric power is generated has been performed (YES in step S110), the CPU of the control unit 900 transmits a drive signal to at least one of the auxiliaries to increase an auxiliary drive amount (step S120), and ends the present routine. Thus, at least one of the auxiliaries is caused to consume the regenerative electric power. That is, if an operational maneuver for making a change to the operation mode in which a larger amount of regenerative electric power is generated is performed in step S110, the regenerative electric power is consumed through the use of at least one of the auxiliaries in accordance with the aforementioned operational maneuver, even when the secondary battery 650 is in the chargeable state. Besides, if the state of a downshift continues in step S110, the operation of consuming the regenerative electric power through the use of at least one of the auxiliaries is continued. The control in step S120 in which at least one of the auxiliaries is caused to consume the regenerative electric power with the regenerative electric power generated (YES in step S100) and with the downshift performed (YES in step S110) is also referred to as "third control" or "specific maneuver control".

In concrete terms, for example, the air compressor 320 can be used as at least one of the aforementioned auxiliaries to consume the regenerative electric power. It should be noted herein that no load is required of the drive motor 820 when a regenerative electric power is generated. If no electric power is substantially generated in the fuel cell 660 and the air compressor 320 is stopped when a regenerative electric power is generated, the air compressor 320 is activated and starts consuming the regenerative electric power in step S120. Besides, if the fuel cell 660 generates an electric power for reasons of, for example, the driving of an air-conditioner in the fuel cell vehicle 10 when a regenerative electric power is generated, the drive amount of the air compressor 320 is increased above a load required of the aforementioned air-conditioner or the like in step S120. As described hitherto, "the increase in auxiliary drive amount" in step S120 includes "an increase in drive amount from a state where at least one of the auxiliaries is driven" and "activation of at least one of the auxiliaries".

Various auxiliaries other than the air compressor 320 can be adopted as at least one of the auxiliaries used to consume the regenerative electric power in step S120, but the high-voltage auxiliaries 860 are desired to be adopted so that the regenerative electric power can be sufficiently consumed. For example, the refrigerant pump 525, the hydrogen pump 290, the radiator fan 535 or the electric heater 730 can be used instead of the air compressor 320. Alternatively, a still another fuel cell auxiliary or still another vehicle auxiliary may be used. A plurality of auxiliaries selected from the above-mentioned auxiliaries may be used to consume the regenerative electric power. Incidentally, the flow dividing valve 340 may be controlled to increase the amount of gas flowing via the oxidation gas bypass pipe 450 in the case where it is desirable to restrain the flow rate of oxidation gas supplied to the fuel cell 660 from increasing when the air compressor 320 is used to consume the regenerative electric power. Besides, the changeover valve 565 may be controlled to change the flow rate of the refrigerant flowing via the refrigerant bypass pipe 550 in the case where it is desirable to restrain the cooling efficiency of the fuel cell 660 from changing when the refrigerant pump 525 or the radiator fan 535 is used to consume the regenerative electric power. Besides, the operation of delivering the air warmed by the heater core 720 into the vehicle may be suppressed, or the drive amount of the radiator fan 535 may be further increased to lower the temperature of the refrigerant in the case where it is desirable to restrain the interior of the vehicle from being warmed when the electric heater 730 is used to consume the regenerative electric power.

If it is determined in step S110 that no downshift has been performed (the operational maneuver for making a change to the operation mode in which a larger amount of regenerative electric power is generated has not been performed) (NO in step S110), the CPU of the control unit 900 determines whether or not the secondary battery 650 is in the non-chargeable state where the secondary battery 650 cannot be charged (step S130). The non-chargeable state can be, for example, a state where the remaining capacity of the secondary battery 650 is equal to or larger than a prescribed reference value as a value at which the secondary battery 650 should no longer be charged. Besides, the non-chargeable state can be a state where the secondary battery 650 has been continuously charged for a prescribed reference time or more. When the secondary battery 650 is continuously charged, the substances in the secondary battery 650 can be biased. Therefore, it is desirable to limit the continuous charging time of the secondary battery 650 from the standpoint of restraining the secondary battery 650 from deteriorating, so it can be determined, based on the continuous charging time, whether or not the secondary battery 650 is in the non-chargeable state. Alternatively, for example, any state where the magnitude of regenerative electric power exceeds a chargeable electric power in the secondary battery 650 may be regarded as the non-chargeable state even when the chargeable electric power in the secondary battery 650 assumes a positive value.

If it is determined in step S130 that the secondary battery 650 is in the non-chargeable state (YES in step S130), the CPU of the control unit 900 makes a transition to step S120 and ends the present routine. That is, the auxiliary drive amount is increased, and at least one of the auxiliaries is caused to consume the regenerative electric power. The control in step S120 in which at least one of the auxiliaries is caused to consume the regenerative electric power when it is determined that the secondary battery 650 is in the non-chargeable state (YES in step S130) with the regenerative electric power generated (YES in step S100) and with no downshift performed (NO in step S110) is also referred to as "second control". The control of causing at least one of the auxiliaries to consume the regenerative electric power in the case where the secondary battery 650 is thus in the non-chargeable state is also referred to as "non-chargeable control".

If it is determined in step S130 that the secondary battery 650 is not in the non-chargeable state, namely, that the secondary battery 650 is in the chargeable state where the secondary battery 650 can be charged (NO in step S130), the CPU of the control unit 900 performs the control of charging the secondary battery 650 with a regenerative electric power (step S140) and ends the present routine. If the secondary battery 650 has not been charged with the regenerative electric power yet, the charging of the secondary battery 650 with the regenerative electric power is started in step S140. If the secondary battery 650 has already been charged with the regenerative electric power, the charging of the secondary battery 650 with the regenerative electric power is continued in step S140. The control in step S140 in which the secondary battery 650 is charged with the regenerative electric power when it is determined that the secondary battery 650 is in the chargeable state (NO in step S130) with the regenerative electric power generated (YES in step S100) and with no downshift performed (NO in step S110) is also referred to as "first control".

As described hitherto, in the present embodiment, when a downshift is performed (YES in step S110) with a regenerative electric power generated (YES in step S100) through the repetitive execution of the regenerative operation control routine of FIG. 2, the third control (specific maneuver control) is started in accordance with the performance of the downshift. Then, while the state of the downshift is maintained (YES in step S110) with the regenerative electric power generated (YES in step S100), the third control is continued. When the regenerative electric power disappears afterward (NO in step S100), the third control is canceled. Besides, when the operation mode is changed to perform an upshift or the like (NO in step S110) even though the regenerative electric power has been generated (YES in step S100), a change is made from the third control to the first control or the second control, depending on whether the secondary battery 650 is in the chargeable state or the non-chargeable state.

With the fuel cell vehicle 10 according to the present embodiment configured as described above, when a downshift (the operational maneuver for making a change to the operation mode in which a larger amount of regenerative electric power is generated) is performed with a regenerative electric power generated, the auxiliary drive amount is increased and at least one of the auxiliaries is caused to consume the regenerative electric power. By adopting this configuration, the driving noise of at least one of the auxiliaries for consuming the regenerative electric power is increased concomitantly with the operational maneuver performed by a user of the fuel cell vehicle 10. Therefore, the feeling of strangeness imparted to the user by the increase in auxiliary driving noise resulting from the consumption of the regenerative electric power can be reduced. That is, the user can be restrained from developing a feeling of strangeness due to a sudden increase in auxiliary driving noise. This is because the user tends to feel that the increase in auxiliary driving noise has something to do with the operational maneuver performed by himself or herself when the auxiliary driving noise increases concomitantly with the operational maneuver performed by the user. In more concrete terms, when a downshift is performed in, for example, a vehicle that is mounted with an engine as a drive source, the engine noise usually increases in accordance with the performance of the downshift. When the auxiliary driving noise increases (or is generated) concomitantly with the performance of the aforementioned operational maneuver by the user, the feeling of strangeness can be reduced by imparting a feeling similar to the increase in auxiliary driving noise to the user.

Besides, according to the present embodiment, when the user performs the operational maneuver as described above, at least one of the auxiliaries is caused to consume the regenerative electric power. Therefore, the consumption of the regenerative electric power can be started before the secondary battery 650 actually assumes the non-chargeable state due to an increase in remaining capacity thereof. Therefore, the reliability of the operation of restraining the remaining capacity of the secondary battery 650 from becoming too large can be enhanced. Furthermore, in the present embodiment, there is no need to determine whether or not the secondary battery 650 is in the non-chargeable state, prior to the consumption of the regenerative electric power by at least one of the auxiliaries. Therefore, the operation of causing at least one of the auxiliaries to consume the regenerative electric power can be simplified.

Besides, according to the present embodiment, the operational maneuver for making a change to the operation mode in which a larger amount of regenerative electric power is generated is adopted as an operational maneuver that is performed by the user concomitantly with an increase in auxiliary driving noise. That is, when a large amount of regenerative electric power is generated, and a change is made to an operation mode in which the secondary battery 650 is likely to assume the non-chargeable state by charging the secondary battery 650 with the regenerative electric power, at least one of the auxiliaries is caused to consume the regenerative electric power. Therefore, the remaining capacity of the secondary battery 650 can be restrained from falling too much, even when at least one of the auxiliaries is caused to consume the regenerative electric power without determining whether or not the secondary battery 650 is in the non-chargeable state.

Incidentally, when the third control is performed in step S120 with a regenerative electric power generated (YES in step S100) and a downshift performed (YES in step S110), the secondary battery 650 may also be in the chargeable state. In this case, the secondary battery 650 may be charged through the use of part of the regenerative electric power, until the remaining capacity of the secondary battery 650 reaches an upper limit when causing at least one of the auxiliaries to consume the regenerative electric power in step S120. In this manner as well, the foregoing effect of restraining the user from developing a feeling of strangeness by performing the operation of increasing the auxiliary drive amount to consume the regenerative electric power when the downshift is perfoiined, and restraining the remaining capacity of the secondary battery 650 from becoming too large by causing at least one of the auxiliaries to consume the regenerative electric power at the time of the downshift when the regenerative electric power increases is obtained.

Besides, in step S130 of the present embodiment, even in the case where the remaining capacity of the secondary battery 650 has not reached the upper limit at which the secondary battery 650 cannot be charged, it may be determined that the secondary battery 650 is in the non-chargeable state when the magnitude of regenerative electric power exceeds the electric power with which the secondary battery 650 can be charged. In this case, the secondary battery may be charged through the use of part of the regenerative electric power until the remaining capacity of the secondary battery 650 reaches the aforementioned upper limit, when the second control is selected to cause at least one of the auxiliaries to consume the regenerative electric power in step S120.

B. Second Embodiment

Figure 3:
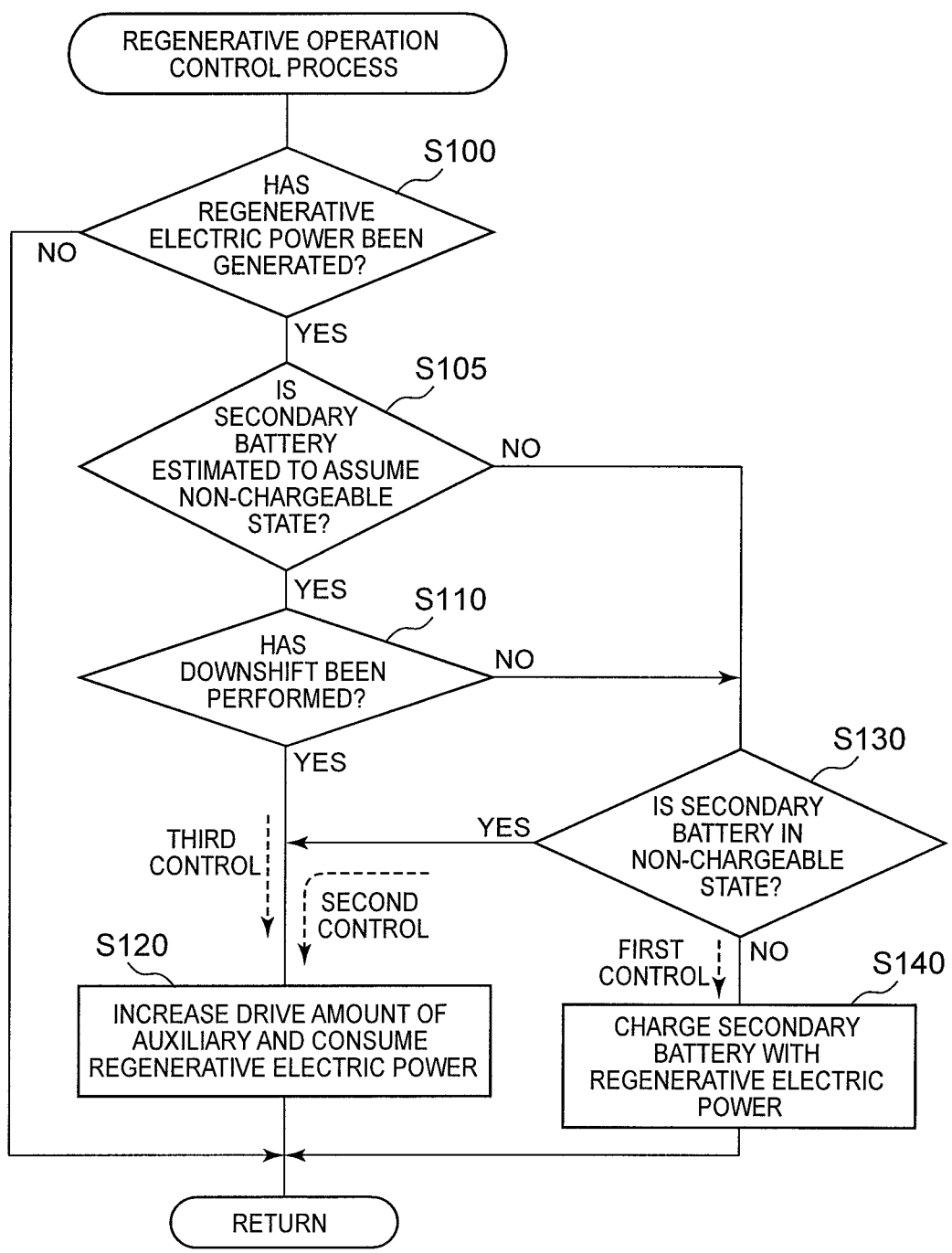
FIG. 3 is a flowchart representing another regenerative operation control process routine.

FIG. 3 is a flowchart representing a regenerative operation control process routine that is performed by the control unit 900 of the fuel cell vehicle 10 according to the second embodiment. The fuel cell vehicle 10 according to the second embodiment is similar in configuration to the fuel cell vehicle 10 according to the first embodiment, so detailed description thereof will be omitted. The flowchart of FIG. 3 and the flowchart of the first embodiment shown in FIG. 2 have something in common. Therefore, common steps are denoted by the same step numbers respectively, and detailed description thereof will be omitted.

In the fuel cell vehicle 10 according to the second embodiment as well as the first embodiment, the first control, the second control and the third control can be performed. The second embodiment is different from the first embodiment in that it is determined whether or not the secondary battery 650 is estimated to assume the non-chargeable state when the fuel cell vehicle 10 continues to run when determining which type of control should be performed.

That is, in the second embodiment, if it is determined in step S100 that a regenerative electric power has been generated (YES in step S100), the CPU of the control unit 900 determines whether or not the secondary battery 650 is estimated to assume the non-chargeable state (step S105). If it is determined in step S105 that the secondary battery 650 is estimated to assume the non-chargeable state (YES in step S105), the CPU of the control unit 900 executes the process starting from the foregoing step S110. Besides, if it is determined in step S105 that the secondary battery 650 is not estimated to assume the non-chargeable state (NO in step S105), the CPU of the control unit 900 executes the process starting from the foregoing step S130. The determination made in step S105 will be described hereinafter.

The fuel cell vehicle 10 according to the second embodiment is equipped with the navigation device 80 that provides guidance on a running route to a destination, and various pieces of information are input to the control unit 900 from the navigation device 80 (see FIG. 1). The navigation device 80 has a position information detection unit (not shown) and a map information storage unit (not shown). The position information detection unit detects position information of the fuel cell vehicle 10. The map information storage unit stores map information. The map information includes, for example, various features to be depicted on a map, more specifically, buildings, roads, traffic lights, or natural objects such as mountains, rivers and the like, etc. Furthermore, in addition to the altitudes and the like of the respective features, the map information includes pieces of feature-related information such as the types, shapes, addresses and the like of buildings in the case where the features are buildings, and includes pieces of feature-related information such as the types, shapes, names and the like of roads in the case where the features are roads. Incidentally, at least part of the map information may be acquired from the outside of the fuel cell vehicle 10 through communication, instead of being stored into the navigation device 80.

The control unit 900 acquires a running route from a current position to a destination and map information on the running route from the aforementioned navigation device 80, estimates a running state of the fuel cell vehicle 10, and determines whether or not the secondary battery 650 is estimated to assume the non-chargeable state (step S105). In concrete terms, for example, the control unit 900 determines, based on the aforementioned map information, whether or not there is a downhill section on the running route, derives pieces of downhill section-related information such as a difference in altitude in the downhill section, a length of the downhill section, an average angle of inclination in the downhill section and the like when the downhill section exists, and determines whether or not at least one of the aforementioned pieces of downhill section-related information exceeds a prescribed reference value. If at least one of the aforementioned pieces of the downhill section-related information exceeds the prescribed reference value, the running state of the fuel cell vehicle 10 is estimated to be a state where the regenerative electric power is too large, so it may be determined in step S105 that the secondary battery 650 is estimated to assume the non-chargeable state. Incidentally, in estimating in step S105 whether or not the secondary battery 650 assumes the non-chargeable state based on the information acquired from the navigation device 80, an remaining capacity (SOC) of the secondary battery 650 may further be acquired, and it may be comprehensively determined whether or not the secondary battery 650 assumes the non-chargeable state during the running on the running route.

Alternatively, the determination in step S105 may be made through the additional use of information on traffic lights provided on the set running route. For example, in the case where road machines that transmit traffic light information (including cycles of how traffic light changes) on respective traffic lights provided on a road are provided at respective places and road-to-vehicle communication is possible between these road machines and the fuel cell vehicle 10, the fuel cell vehicle 10 can acquire the traffic light information on the traffic lights provided on the running route, through road-to-vehicle communication. Then, when the fuel cell vehicle is estimated to stop due to traffic lights at a frequency equal to or higher than a prescribed reference frequency while running on the running route, based on the acquired traffic light information and, for example, a current vehicle speed or the like, it can be determined in step S105 that the secondary battery 650 is estimated to assume the non-chargeable state. Note that the frequency here is referred to how often the vehicle is estimated to stop due to traffic lights.

Incidentally, the determination in step S105 may be made without using the information acquired from the navigation device 80. As an example of this determination, a determination based on the information on the traffic lights will be described. For example, the fuel cell vehicle 10 may be mounted with an image pickup device and determine whether or not there is a traffic light ahead and determine whether or not a traffic light is red when this traffic light exists, by continuously picking up images of a space ahead of the vehicle in a traveling direction thereof and analyzing the picked-up images. Then, if it is determined that there is a traffic light ahead and that this traffic light is red, the control unit 900 may compare a regenerative electric power considered to be generated in stopping from a current vehicle speed and a chargeable energy obtained from a current remaining capacity (SOC) of the secondary battery 650 with each other, and determine whether or not the secondary battery 650 is estimated to assume the non-chargeable state when the vehicle stops at the aforementioned traffic light.

By adopting this configuration, at least one of the auxiliaries is further caused to consume the regenerative electric power when it is determined that the secondary battery is estimated to assume the non-chargeable state, unlike the first embodiment. Therefore, the operation of causing at least one of the auxiliaries to consume the regenerative electric power can be performed at a more appropriate timing than in the case where only the conditions of the generation of the regenerative electric power and the downshift are fulfilled. In concrete terms, in the case where, for example, the vehicle runs in an uphill section afterward even though a regenerative electric power has been generated and a downshift has been performed, the remaining capacity of the secondary battery 650 is unlikely to become too large even when the secondary battery 650 is charged with the regenerative electric power. In the present embodiment, for example, ahead of the uphill section, the secondary battery 650 is not estimated to assume the non-chargeable state and the secondary battery 650 is estimated able to be charged with the regenerative electric power, so the energy utilization rate of the fuel cell vehicle 10 can be enhanced. In particular, the accuracy in estimating whether or not the secondary battery 650 assumes the non-chargeable state in step S105 can be enhanced through the use of the information acquired by the navigation device 80.

C. Third Embodiment

FIG. 4 is a flowchart representing a regenerative operation control process routine that is executed by the control unit 900 of the fuel cell vehicle 10 according to the third embodiment. The fuel cell vehicle 10 according to the third embodiment is similar in configuration to the fuel cell vehicle 10 according to the first embodiment, so detailed description thereof will be omitted. The flowchart of FIG. 4 and the flowchart of the first embodiment shown in FIG. 2 have something in common. Therefore, common steps are denoted by the same step numbers respectively, and detailed description thereof will be omitted.

The first control, the second control and the third control can be performed in the fuel cell vehicle 10 according to the third embodiment as well as the first embodiment. The third embodiment is different from the first embodiment in that the auxiliaries for use are prioritized when the second control and the third control are performed to cause the auxiliaries to consume the regenerative electric power.

In the third embodiment, the auxiliaries used to consume the regenerative electric power are classified into a first auxiliary and a second auxiliary whose driving noise is quieter than that of the first auxiliary. Then, when the auxiliaries are caused to consume the regenerative electric power in step S120 as the third control, the first auxiliary is driven by priority. Besides, when the auxiliaries are caused to consume the regenerative electric power in step S135 as the second control, the second auxiliary is driven by priority. Incidentally, the description of FIG. 2 has been given with both the second control and the third control included in step S120. In the third embodiment, however, the auxiliary used in the second control and the auxiliary used in the third control are different in priority from each other. In FIG. 4, therefore, step S120 of the third control and step S135 of the second control are so depicted as to be distinguished from each other.

It should be noted herein that the driving by priority means that the auxiliary to be driven by priority is used to consume the regenerative electric power and that the other auxiliary is additionally used to consume the regenerative electric power when the auxiliary to be driven by priority does not possess a capacity high enough to consume the regenerative electric power to be consumed.

The first auxiliary can be, for example, an auxiliary selected from the air compressor 320 and the radiator fan 535. Besides, the second auxiliary can be, for example, an auxiliary selected from the electric heater 730, the refrigerant pump 525 and the hydrogen pump 290. The second control and the third control will be described hereinafter in more detail, citing an example in which the air compressor 320 is used as the first auxiliary and the electric heater 730 is used as the second auxiliary.

In the third embodiment, in step S120 in which the third control is performed, the air compressor 320 is used by priority as the auxiliary that is caused to consume the regenerative electric power. In concrete terms, when PA denotes a driving power command value of the air compressor 320, PH denotes a power command value of the electric heater 730, PAmax denotes a maximum electric power consumption of the air compressor 320, PM denotes a regenerative electric power (an electric power generated by the drive motor 820), and PBalw denotes an electric power with which the secondary battery 650 can be charged, the driving power command value PA of the air compressor 320 and the power command value PH of the electric heater 730 can be expressed by equations (1) and (2) shown below, respectively. Incidentally, in the equation (1), MIN (A, B) represents the smaller one of A and B.

$$PA = MIN(PAmax, PM) \quad (1)$$

$$PH = PM - PA \quad (2)$$

Accordingly, if the maximum electric power consumption PAmax of the air compressor 320 is equal to or larger than the regenerative electric power PM in step S120, the air compressor 320 consumes the entire regenerative electric power. Besides, if the maximum electric power consumption PAmax of the air compressor 320 is smaller than the regenerative electric power PM in step S120, the amount of electric power consumed by the air compressor 320 is equal to the maximum electric power consumption PAmax of the air compressor 320. At this time, the electric heater 730 consumes the regenerative electric power that cannot be consumed by driving the air compressor 320, as indicated by the equation (2).

If the chargeable electric power PBalw of the secondary battery 650 is a positive value in step S120, the secondary battery 650 may be charged through the use of part of the regenerative electric power. In this manner, the refrigerant is restrained from being heated by the electric heater 730. Therefore, the temperature of the refrigerant is more easily adjusted when no command regarding heating has been input in the fuel cell vehicle 10. In this case, the aforementioned equation (2) is replaced with an equation (2a) shown below.

$$PH=PM-PBalw-PA \qquad (2a)$$

The chargeable electric power PBalw of the secondary battery 650 fluctuates based on the temperature of the secondary battery 650 and the charge/discharge history of the secondary battery 650 as well as the remaining capacity (SOC) of the secondary battery 650. The control unit 900 always calculates the chargeable electric power PBalw while acquiring these pieces of information.

Incidentally, when the maximum electric power consumption PAmax of the air compressor 320 is equal to or larger than the regenerative electric power PM, the power command value PH of the electric heater 730 in each of the equations (2) and (2a) is equal to or smaller than 0. In this case, when no command regarding the heating of the vehicle has been input, no electric power is supplied to the electric heater 730. Besides, when a command regarding the heating of the vehicle has been input, the electric heater 730 consumes the electric power corresponding to the inputting of the command.

In the present embodiment, if an operation of a downshift is detected in step S110 (YES in step S110) and the regenerative electric power is relatively small at the time of the execution of step S120, only the air compressor 320 is used to start consuming the regenerative electric power. Then, when the regenerative electric power PM exceeds the maximum electric power consumption PAmax of the air compressor 320 due to an ensuing increase in the regenerative electric power, the electric heater 730 as well as the air compressor 320 is used to consume the regenerative electric power.

Besides, in the third embodiment, the electric heater 730 is used by priority as the auxiliary that is caused to consume the regenerative electric power, in step S135 in which the second control is performed. In concrete terms, when PHmax denotes a maximum electric power consumption of the electric heater 730, the power command value PH of the electric heater 730 and the driving power command value PA of the air compressor 320 can be expressed by equations (3) and (4) shown below, respectively.

$$PH=MIN(PM,PHmax) \qquad (3)$$

$$PA=MIN((PM-PH),PAmax) \qquad (4)$$

In step S135, when the maximum electric power consumption PHmax of the electric heater 730 is equal to or larger than the regenerative electric power PM as indicated by the equation (3), the electric heater 730 consumes the entire regenerative electric power. Besides, when the maximum electric power consumption PHmax of the electric heater 730 is smaller than the regenerative electric power PM, the amount of electric power consumed by the electric heater 730 is equal to the maximum electric power consumption PHmax of the electric heater 730. At this time, the air compressor 320 consumes the regenerative electric power that cannot be consumed by the electric heater 730, as indicated by the equation (4).

In step S135, when the chargeable electric power PBalw of the secondary battery 650 is a positive value, the secondary battery 650 may be charged through the use of part of the regenerative electric power. In this manner, the refrigerant is restrained from being heated by the electric heater 730. Therefore, when no command regarding heating has been input in the fuel cell vehicle 10, the temperature of the refrigerant is more easily adjusted. In this case, the aforementioned equation (3) is replaced with an equation (3a) shown below, and the aforementioned equation (4) is replaced with an equation (4a) shown below.

$$PH=MIN((PM-PBalw),PHmax) \qquad (3a)$$

$$PA=MIN((PM-PBalw-PH),PAmax) \qquad (4a)$$

Incidentally, when the maximum electric power consumption PHmax of the electric heater 730 is equal to or larger than the regenerative electric power PM, the power command value PA of the air compressor 320 in each of the equations (4) and (4a) is equal to 0. In this case, the fuel cell 660 is substantially stopped from generating electric power. If there is no need to supply oxidation gas to the fuel cell 660, no electric power is supplied to the air compressor 320. Besides, when the fuel cell 660 generates electric power, the air compressor 320 is supplied with electric power such that oxidation gas can be supplied in accordance with the amount of electric power generated by the fuel cell 660.

In the present embodiment, if it is determined in step S110 that no downshift has been performed (NO in step S110), it is determined in step S130 that the secondary battery 650 is in the non-chargeable state (YES in step S130). When the regenerative electric power is relatively small at the time of the execution of step S135, only the electric heater 730 is used to consume the regenerative electric power. Then, when the regenerative electric power PM exceeds the maximum electric power consumption PHmax of the electric heater 730 due to an ensuing increase in the regenerative electric power, the air compressor 320 as well as the electric heater 730 is used to consume the regenerative electric power.

If the regenerative electric power cannot be consumed even through the use of the air compressor 320 and the electric heater 730 in step S120 and step S135, still another auxiliary may be used to consume the regenerative electric power.

With the fuel cell vehicle 10 according to the third embodiment configured as described above, when the third control is performed, the first auxiliary, whose driving noise is relatively loud, is used by priority to consume the regenerative electric power. Therefore, even when a relatively loud driving noise is generated by the first auxiliary, the generation of this driving noise is concomitant with the downshift (the operational maneuver for making a change to the operation mode in which a larger amount of regenerative electric power is generated), so the user can be restrained from developing a feeling of strangeness. Besides, in the present embodiment, when the regenerative electric power cannot be sufficiently consumed by the first auxiliary in the third control, the second auxiliary is further caused to start consuming the regenerative electric power after the downshift. In this case, the driving noise of the second auxiliary is relatively quiet. Therefore, even when the second auxiliary is caused to start consuming the regenerative electric power at a timing different from the operational maneuver performed by the user, the user can be restrained from developing a feeling of strangeness.

Furthermore, according to the third embodiment, when the second control is performed, the regenerative electric power is consumed using the second auxiliary, whose driving noise is relatively quiet, by priority. In this case, even when it is determined that the secondary battery 650 is in the non-chargeable state (YES in step S130) and the operation of consuming regenerative electric power by the second auxiliary is started all of a sudden, the user can be restrained from developing a feeling of strangeness, because the driving noise of the second auxiliary is relatively quiet. Then, the first auxiliary can be restrained from being used, through the use of the second auxiliary by priority. Besides, in the present embodiment, when regenerative electric power cannot be sufficiently consumed by the second auxiliary in the second control, the consumption of regenerative electric power by the first auxiliary is additionally started. In this case, the second auxiliary is used by priority, so the amount of electric power consumed by the first auxiliary can be reduced, and the driving noise of the first auxiliary, whose driving noise is relatively loud, can be further abated. Therefore, the user can be restrained from developing a feeling of strangeness as a result of the consumption of regenerative electric power through the additional use of the first auxiliary.

In the third embodiment, the first auxiliary is used by priority to consume regenerative electric power in performing the third control, and the second auxiliary is used by priority to consume regenerative electric power in performing the second control, but the third embodiment may adopt configurations different therefrom. For example, an auxiliary different from the aforementioned one may be selected as the auxiliary for consuming regenerative electric power, either in performing the third control or in performing the second control.

D. Other Embodiments

The second embodiment and the third embodiment may be combined with each other. That is, the configuration in which the third control is performed when the electric storage device is estimated to assume the non-chargeable state and the configuration in which the auxiliary to be used by priority to consume the regenerative electric power in the third control or the second control is selected depending on the driving noise may be combined with each other.

The disclosure is not limited to the aforementioned embodiments thereof but can be realized in various configurations within such a range as not to depart from the gist thereof. For example, the technical features in the embodiments corresponding to the technical features in the respective aspect can be replaced with one another or combined with one another in an appropriate manner, so as to solve one, some or all of the aforementioned problems or achieve one, some or all of the aforementioned effects. Besides, the technical features can be deleted in an appropriate manner unless they are described as indispensable in the present specification. Besides, for instance, the example in which the control is performed in the fuel cell vehicle has been described in each of the aforementioned embodiments. However, the control is applicable to any vehicle that is configured to enable regenerative electric power generation and cause an auxiliary to consume a regenerative electric power in a condition where a secondary battery cannot be charged with the regenerative electric power.

What is claimed is:

1. A vehicle comprising:
   an electric storage device configured to be charged;
   a drive motor configured to be driven by an electric power and to generate a regenerative electric power;
   an auxiliary configured to be driven by the regenerative electric power generated through a regenerative electric power generation of the drive motor; and
   a control unit, wherein the control unit is configured to:
      perform a non-chargeable control for supplying the regenerative electric power to the auxiliary and causing the auxiliary to consume the regenerative electric power, when the electric storage device is in a non-chargeable state where the electric storage device cannot be charged; and
      determine whether an operational maneuver for making a change to an operation mode in which a larger amount of the regenerative electric power is generated in the vehicle is performed, and in response to determining that the operational maneuver is performed, perform a specific maneuver control for supplying the regenerative electric power to the auxiliary and causing the auxiliary to consume the regenerative electric power, even when the electric storage device is in a chargeable state where the electric storage device can be charged.

2. The vehicle according to claim 1, wherein the control unit is configured to perform the specific maneuver control when the operational maneuver is performed and the electric storage device is estimated to assume the non-chargeable state due to the regenerative electric power generated in accordance with running of the vehicle.

3. The vehicle according to claim 2, further comprising a navigation device that provides guidance on a running route to a destination, wherein the control unit is configured to estimate, based on information acquired from the navigation device, whether or not the electric storage device assumes the non-chargeable state.

4. The vehicle according to claim 1, wherein:
   the auxiliary includes a first auxiliary and a second auxiliary;
   a driving noise of the second auxiliary is quieter than a driving noise of the first auxiliary; and
   the control unit is configured to cause the first auxiliary to consume the regenerative electric power, and use the second auxiliary as well as the first auxiliary to consume the regenerative electric power when the first auxiliary alone cannot consume the regenerative electric power, when performing the specific maneuver control.

5. The vehicle according to claim 1, wherein
   the auxiliary includes a first auxiliary and a second auxiliary;
   a driving noise of the second auxiliary is quieter than a driving noise of the first auxiliary; and
   the control unit is configured to cause the second auxiliary to consume the regenerative electric power, and use the first auxiliary as well as the second auxiliary to consume the regenerative electric power when the second auxiliary alone cannot consume the regenerative electric power, in performing the non-chargeable control.

6. A method of controlling a vehicle which includes an electric storage device being configured to be charged, a drive motor configured to be driven by an electric power and to generate a regenerative electric power, and an auxiliary configured to be driven by the regenerative electric power generated through a regenerative electric power generation of the drive motor, the method comprising:

supplying the regenerative electric power to the auxiliary and causing the auxiliary to consume the regenerative electric power, when the electric storage device is in a non-chargeable state where the electric storage device cannot be charged; and determining whether an operational maneuver for making a change to an operation mode in which a larger amount of the regenerative electric power is generated in the vehicle is performed, and in response to determining that the operational maneuver is performed, supplying the regenerative electric power to the auxiliary and causing the auxiliary to consume the regenerative electric power, even when the electric storage device is in a chargeable state where the electric storage device can be charged.

* * * * *